June 19, 1928.
A. M. SHEARMAN
FLOUR SIFTER TIN
Filed Nov. 29, 1927
1,674,346
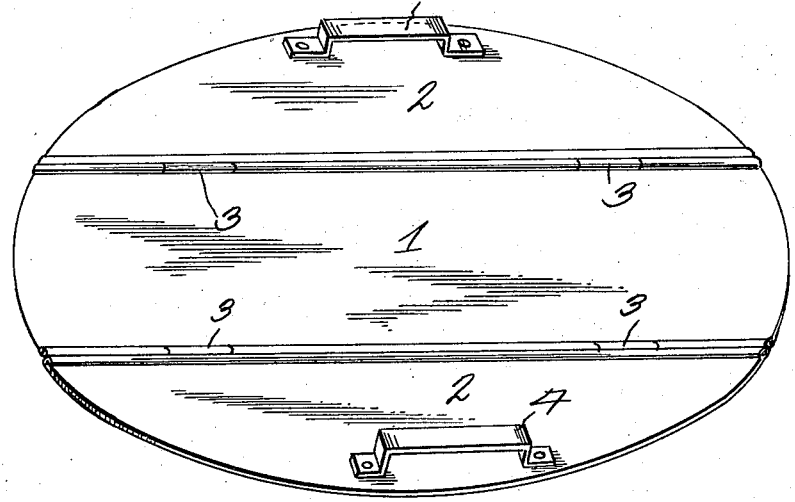
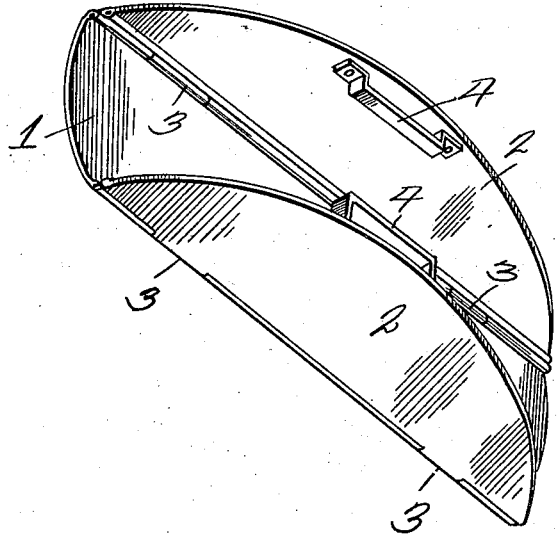
Inventor
Alice M. Shearman
By Philip A. H. Sewell
Attorney Patented June 19, 1928.

1,674,346

UNITED STATES PATENT OFFICE.

ALICE M. SHEARMAN, OF OMAHA, NEBRASKA.

FLOUR-SIFTER TIN.

Application filed November 29, 1927. Serial No. 236,433.

The invention relates to flour sifter tins and has for its object to provide a device of this character formed from a plurality of hingedly connected sections adapted to be placed on a support, for instance a table and onto which flour is sifted, and after the sifting operation the device may be formed into a chute for again depositing the flour in the sifter for resifting.

A further object is to provide a sifter tin having a central section and side sections hingedly connected thereto and handle members carried by the side sections whereby upon grasping the handles the side sections will be moved to angular positions in relation to the central section thereby forming a chute for the material on the device.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the sifter tin, showing the same in open position.

Figure 2 is a perspective view of the tin, showing the same in the form of a chute.

Referring to the drawing, the numeral 1 designates the central section and 2 the wing sections which are hingedly connected at 3 to opposite sides of the central section. It will be noted that when the device is in the position shown in Figure 1, for instance on a table, the sections 1 and 2 are in the same plane, and the sections, in conjunction, form a relatively large flat member onto which flour from a sifter may be deposited with the sifter above the device. In sifting flour, it is necessary to run the material through the sifter several times, and it will be seen after the first sifting operation, it will only be necessary for the operator to grasp the handle members 4 carried by the sections 2 for hingedly moving the sections 2 upwardly to the position shown in Figure 2 for forming a chute from which the material may be discharged into the sifter for the second operation. It will be noted that as the sections 2 are moved upwardly, the sifted flour will be moved by gravity to the center of the device, thereby obviating the necessity of scraping the sifted material into a pile with the hands and placing the same into some receptacle for dumping the sifted flour into the sifter for the second operation. The device is preferably made from tin, however applicant does not limit herself in this respect.

From the above it will be seen that a sifter tin is provided which is simple in construction, compact as the same will fold into a compact structure for shipment and storage purposes, will easily and quickly form a chute, and one which may be cheaply manufactured and sold.

The invention having been set forth what is claimed as new and useful is:—

1. A sifter tin of the character described formed from a plurality of hingedly connected sections and handle members carried by the outer hingedly connected sections.

2. A sifter tin of the character described comprising a central flat section, side sections hingedly connected to opposite sides of the central section, and handle members carried by the side sections adjacent their outer edges.

In testimony whereof I hereunto affix my signature.

ALICE M. SHEARMAN.